Feb. 6, 1968 L. SCHERZ 3,366,971

LINER LAMINATE AND HELMET LINER FORMED THEREFROM

Filed Oct. 24, 1965

INVENTOR

LOUIS SCHERZ

BY Mason, Porter, Diller & Brown

ATTORNEY

United States Patent Office 3,366,971
Patented Feb. 6, 1968

3,366,971
LINER LAMINATE AND HELMET LINER
FORMED THEREFROM
Louis Scherz, 184 Charles St., Wilkes-Barre, Pa. 18702;
Celia Scherz, executrix of said Louis Scherz, deceased
Filed Oct. 24, 1965, Ser. No. 504,381
3 Claims. (Cl. 2—3)

ABSTRACT OF THE DISCLOSURE

A liner for helmets or the like which is readily stretchable in substantially universal manner, thereby to conform perfectly to head forms in a large range of head sizes, the liner being formed of a laminate comprising an inner layer of knitted cotton, an intermediate layer of plastic foam, and an outer layer of woven nylon, each layer being universally stretchable and the layers being stitched together in the general form of square quilted areas.

---

The invention relates generally to the making of headwear, and more particularly to a material especially adapted for the making of headwear liners, but which may be employed in other uses to great advantage.

In the making of headwear, head form fitting and comfort of the wearer are prime requisites, and this is especially true in the making of liners for helmets or the like. Therefore, it is a purpose of the present invention to provide a novel material structure or combination which is readily stretchable, and stretchable in substantially universal manner, thereby to conform perfectly with head contours in such a way as to permit the manufacturing of helmet liners or comparable structures in a single size pattern covering a large range of head sizes, easily as many as eight.

In its more detailed nature the invention seeks to provide a material of the character stated which combines with the feature of free, all direction stretchability, a very fine insulating quality, there being included a moisture collecting cotton inner ply, an intermediate ply of plastic foam acting as a good insulator and also as a moisture barrier, and an outer ply of washable nylon serving as an outer covering and cooperating with the other plies in providing for the desired stretchability.

Another object of the invention is to provide a material of the character stated which is quilted by bias-stitching together of the plies with the stitch lines defining diamonds or squared areas, the corners of said areas preferably being placed on major stretch lines.

A further object of the invention is to provide a material laminate of the character stated wherein the outer ply or facing of nylon is spot coated at spaced intervals along a terminal margin thereof with a bonding agent effective to locally reduce stretchability and thereby assure against objectionable distortion which might interfere with accurate handling of the material.

With the above and other objects in view that will hereinafter appear, the nature of the invention will be more clearly understood by reference to the following detailed description, the appended claims and the several views illustrated in the accompanying drawing.

In the drawings:

FIGURE 3 is a perspective view showing one use of the novel laminate, the same being made up in the form of a liner for an industrial helmet or the like.

Figure 1:
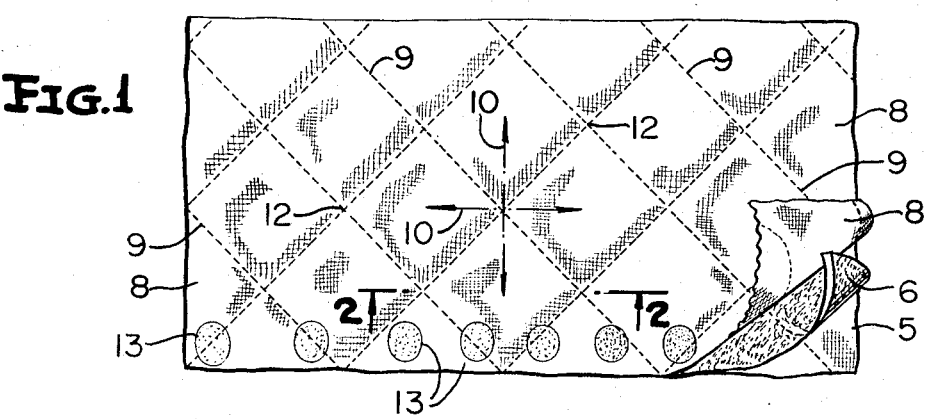
FIGURE 1 is a fragmentary outer face view illustrating a laminate embodying the invention.

In the practical development of the invention, the improved liner material is made up of an inner layer or ply 5 of closely knitted, universally stretchable cotton, an intermediate layer 6 of universally stretchable foam, preferably of the ester type polyurethane, which may, if desired, be provided with a surface finish or coating 7 of a suitable moisture repelling material, and an outer or facing layer of closely woven universally stretchable nylon. This laminate is quilted by stitching on the bias at 9, forming squares or diamonds. While universally stretchable, the stretch is particularly effective along the lines 10, 11, as applied on FIGURE 1, or across the corners 12 of the quilted stitching. The laminate may be provided with spaced spot treatment at marginal edge portions as indicated at 13 in FIGURE 1, the binder material thus applied serving to embed itself in the interstices of the facing nylon 8 and to locally control the stretch so as to facilitate accurate handling of the laminate.

Figure 2:
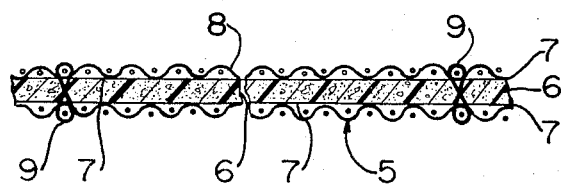
FIGURE 2 is an enlarged vertical cross section taken on the line 2—2 on FIGURE 1.
Figure 3:
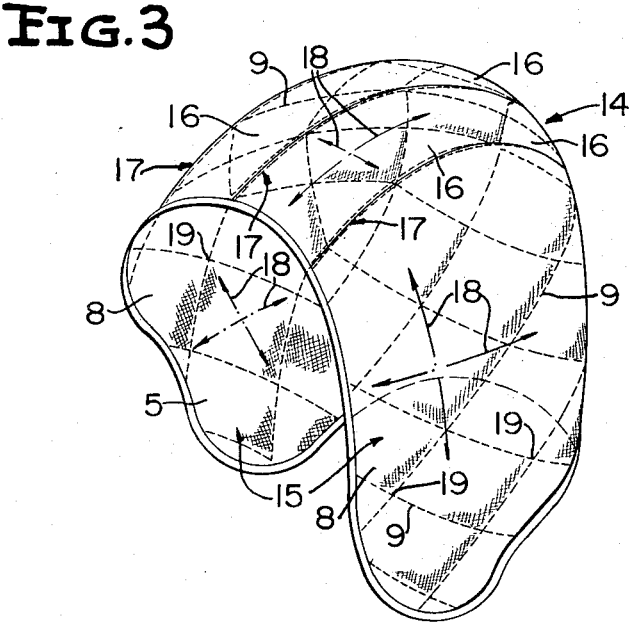

While subject to many uses, the quilted laminate of FIGURES 1 and 2 will be found to be highly desirable and readily adaptable to use in liners for industrial or sports helmets or the like. See for example FIGURE 3 wherein the liner generally designated 14 may be composed of side pieces 15 and crown and back pieces 16 joined by any approved seaming at 17 to provide the head conforming shaping generally as indicated in FIGURE 3. It will be apparent how universal stretching is provided in the liner assembled generally as in FIGURE 3, the stretch being provided for along the lines indicated at 18 and generally passing through the quilting corners 19 preferably placed as illustrated in FIGURE 3.

It has been found that helmet liners assembled generally as herein described and shown in FIGURE 3 and shaped to snugly conform to the head of a wearer will provide perfect comfort through stretching in all directions, there being no localized line constriction such as would form furrows in the scalp or forehead of a wearer, with attendant discomfort. It has been found also that with the universal stretchability provided in the particular formation of the laminate, provision can be made for the manufacturing of helmet liners or comparable structures in a single size pattern covering a large range of head sizes, easily as many as eight.

The improved liner material is completely washable, when employed in helmet liners, and in use, the inner cotton layer will be effective to absorb moisture, such as perspiration, whereas the intermediate layer of foam treated with its moisture barrier face treatments at 7—7 will act as a moisture barrier. The described form of the intermediate layer 6 also serves the purpose of providing a very good insulator, the skin or facings at 7—7 having the quality of shedding moisture without so sealing the foam as to destroy its free breathing and insulating action, or its universal stretching quality.

The improved liner material has been disclosed herein as to its general qualities, and one highly desirable specific use has been disclosed, but it is to be understood that variations in the specific form of the laminate may be made, and various uses thereof resorted to, without departing from the spirit and scope of the invention as defined in the appended claims.

I claim:

1. A laminate of the character described comprising an inner layer of closely knitted cotton, an intermediate layer of plastic foam, and an outer layer of closely woven nylon, said layers being stitched together in the form of a composite unit, each said layer being universally stretchable, the stitching being in the general form of squared quilting areas and on the bias with relation to the cotton knit and the nylon weave, the cotton layer having the quality of absorbing moisture such as perspiration, and the foam layer having thereon moisture barrier surface finishing.

2. The laminate defined in claim 1 wherein marginal edge portions of the laminate are space spotted with a binder effective to provide stretch limiting areas and serve to facilitate accurate handling of the laminate.

3. A helmet liner shaped to conform snugly to the head of a wearer and comprising side pieces, crown and back pieces connected by seaming, there being included in said pieces laminates made up of an inner layer of closely knitted cotton, an intermediate layer of plastic foam, and an outer layer of closely woven nylon, each said layer being universally stretchable, and the layers in each piece being stitched together in the form of a quilted composite unit, the stitching being in the general form of squared quilting areas and on a bias with relation to the cotton knit and the nylon weave, each cotton layer having the quality of absorbing moisture such as perspiration, and the foam layer having thereon moisture barrier surface finishing.

References Cited

UNITED STATES PATENTS

| | | | |
|---|---|---|---|
| 1,483,881 | 2/1924 | Hart | 2—3 |
| 2,289,345 | 7/1942 | Craig et al. | 2—6 |
| 2,921,457 | 1/1960 | Evans | 2—2.1 X |
| 2,981,954 | 5/1961 | Garbellano | 2—67 X |
| 3,251,727 | 5/1966 | Reynolds et al. | 161—148 |

JORDAN FRANKLIN, *Primary Examiner.*

J. R. BOLER, *Examiner.*